United States Patent
Dureiko et al.

(10) Patent No.: US 9,642,218 B1
(45) Date of Patent: May 2, 2017

(54) WIRELESS BEHAVIORAL FEEDBACK FOR ACTIVE LIGHTING CONTROL

(71) Applicant: GE Lighting Solutions, LLC, East Cleveland, OH (US)

(72) Inventors: Rick Dean Dureiko, East Cleveland, OH (US); Thomas Clynne, East Cleveland, OH (US)

(73) Assignee: GE LIGHTING SOLUTIONS, LLC, East Cleveland, OH (US)

(*) Notice: Subject to any disclaimer, the term of this patent is extended or adjusted under 35 U.S.C. 154(b) by 0 days.

(21) Appl. No.: 14/948,912

(22) Filed: Nov. 23, 2015

(51) Int. Cl.
*H05B 37/02* (2006.01)
*G08B 1/08* (2006.01)
*G08C 17/02* (2006.01)

(52) U.S. Cl.
CPC ......... *H05B 37/0227* (2013.01); *G08C 17/02* (2013.01); *H05B 37/0272* (2013.01)

(58) Field of Classification Search
CPC  H05B 37/02; H05B 37/0227; H05B 37/0272; G08C 17/02; G01B 1/08; G08B 21/00; G08B 13/187; G08B 13/2491
USPC ........... 315/291, 297, 307, 308, 312; 340/539.11, 539.12, 539.21, 539.23, 541, 340/552, 571
See application file for complete search history.

(56) References Cited

U.S. PATENT DOCUMENTS

| | | |
|---|---|---|
| 7,884,727 B2 | 2/2011 | Tran |
| 8,710,984 B2 | 4/2014 | Wilson |
| 2008/0018464 A1 | 1/2008 | van Doorn |
| 2008/0143529 A1 | 6/2008 | Gauvreau |
| 2009/0039797 A1 | 2/2009 | Wang et al. |

(Continued)

FOREIGN PATENT DOCUMENTS

| | | |
|---|---|---|
| RS | 20110288 A2 | 2/2012 |
| RS | 20120285 A1 | 2/2014 |

(Continued)

OTHER PUBLICATIONS

Motion Sensing without Sensors: Information Harvesting from Signal Strength Measurements.

(Continued)

*Primary Examiner* — Jimmy Vu
(74) *Attorney, Agent, or Firm* — GE Global Patent Operation; Peter T. DiMauro

(57) ABSTRACT

A new apparatus, system, method and a computer readable memory are presented for lighting control using active wireless active feedback monitoring of behavioral activity of moving objects, for lighting control in an area of interest using, for example, a time dependence of a received signal strength parameter (RSSP) and a calculated standard deviation of the RSSP. Presence of moving objects (such as humans, pets/animals, cars and the like) within the range of an established wireless network tends to modulate the wireless signal strength between wireless nodes. Using the monitored variation in the standard deviation of the wireless signal strength between network nodes, behavioral activity of moving objects may be used to directly control ambient lighting conditions such as luminaire lumen output, color temperature, light distribution, and/or other lighting characteristics, based upon the level of behavioral activity of moving objects within an area of interest.

20 Claims, 12 Drawing Sheets

(56) References Cited

U.S. PATENT DOCUMENTS

| | | |
|---|---|---|
| 2010/0277333 A1* | 11/2010 | Van De Sluis .... H05B 37/0227 340/686.1 |
| 2012/0025849 A1 | 2/2012 | Habib |
| 2012/0235579 A1 | 9/2012 | Chemel et al. |
| 2013/0069543 A1 | 3/2013 | Mohan et al. |
| 2014/0200856 A1 | 7/2014 | Wilson |
| 2015/0015145 A1 | 1/2015 | Carrigan et al. |
| 2015/0264781 A1 | 9/2015 | Jusl n et al. |

FOREIGN PATENT DOCUMENTS

| | | |
|---|---|---|
| RS | 20130027 A1 | 6/2014 |
| WO | 2015054611 A1 | 4/2015 |

OTHER PUBLICATIONS

International Search Report and Written Opinion issued in connection with corresponding PCT Application No. PCT/US2016/061016 on Jan. 9, 2017.

* cited by examiner

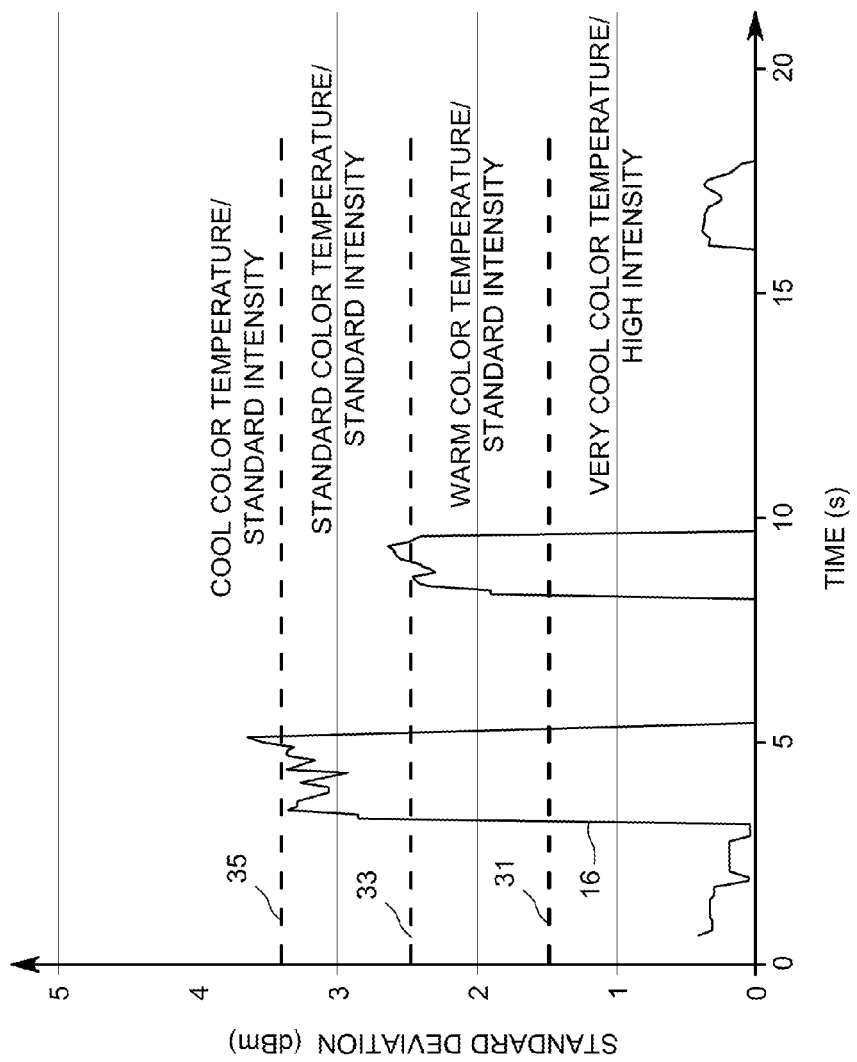

US 9,642,218 B1

WIRELESS BEHAVIORAL FEEDBACK FOR ACTIVE LIGHTING CONTROL

TECHNICAL FIELD

The invention generally relates to lighting systems and wireless devices. More particularly but not exclusively, this invention relates to wireless monitoring of behavioral activity of moving objects for lighting control.

BACKGROUND OF THE INVENTION

Motion feedback in conventional lighting control systems is implemented using additional sensors such as PIR (passive infrared) to implement automatically-activated lighting systems. The infrared detectors can detect infrared radiation emitted by an object/moving object. This is a costly approach, especially considering installation cost.

Other motion sensors based on sonic or ultrasonic/acoustical detectors, break-beam (active) devices, video systems and the like, which are used in motion/intrusion detection, can be also used to control lighting. The challenges which still remain are device and installation cost for all approaches, false alarms (e.g., for acoustic detectors), susceptibility to environmental changes (e.g., for acoustical detectors and PIR devices), difficulty of identifying motion, directionality and distance information (e.g., for acoustical, PIR and break-beam devices), unrealistic memory requirements (for video system), etc.

SUMMARY OF THE INVENTION

According to a first aspect of the invention, an apparatus for monitoring one or more moving objects in an area of interest to control lighting in the area, the apparatus comprising: at least one wireless radio transceiver in the area configured to: transmit one or more signals, and receive one or more signals, each having reflected contributions from at least one of the one or more moving objects in the area; and a controller of the at least one wireless radio transceiver, configured to: analyze, for each of the received one or more signals, a time dependence of at least a standard deviation of a received signal strength parameter (RSSP) in reference to corresponding one or more threshold values for indicating a behavioral activity change of the one or more moving objects; and adjust light characteristics of one or more lighting devices in the area, if the analysis meets a predefined criterion at least for one of the received one or more signals.

According further to the first aspect of the invention, the adjustment of light characteristics may include adjusting at least a color temperature of the one or more lighting devices based on exceeding or not exceeding one or more threshold values by the standard deviation of the RSSP.

Still further according to the first aspect of the invention, the adjustment of light characteristics may include adjusting a color temperature and a luminaire light value of the one or more lighting devices based on exceeding or not exceeding one or more threshold values by the standard deviation of the RSSP.

According further to the first aspect of the invention, the adjustment of light characteristics may include adjusting a distribution of the one or more lighting devices.

According still further to the first aspect of the invention, an initial presence of at least one moving object among the one or more moving objects in the area may be detected by analyzing any of at least one threshold value of the standard deviation of the RSSP and a further threshold value of the RSSP.

According yet further still to the first aspect of the invention, one of the one or more threshold levels may be set such that a presence of at least one moving object can be only detected in a near field within about 10 cm from the apparatus to adjust a corresponding non-contact switch for controlling at least one of the one or more lighting devices.

Yet still further according to the first aspect of the invention, all transmitted and received signals may be omnidirectional.

Still yet further according to the first aspect of the invention, the at least one wireless radio transceiver may comprise a smart lamp.

Still further still according to the first aspect of the invention, the at least one wireless radio transceiver may comprise a plurality of directional receivers, each monitoring a different portion of the area for indication of the behavioral activity of the one or more moving objects, to adjust the light characteristics of the different portions of the area individually to include a light distribution among a plurality of lighting devices in the area. Further, the at the at least one wireless radio transceiver may comprise a plurality of directional transmitters, each providing a transmitted signal for a portion of the area monitored by a corresponding receiver of the plurality of directional receivers. Still further, the plurality of receivers may be implemented as one receiver using one moving antenna to monitor the different portions of the area at different time instances.

According further still to the first aspect of the invention, one of the one or more transmitted signals may be received by a further transceiver in the area, and the transceiver may be configured to receive an acknowledgement signal from the further transceiver as one of the one or more signals having reflected contributions from the one or more moving objects. Further, the acknowledgement signal may comprise values of RSSP measured by the further transceiver for the one of the one or more transmitted signals by the transceiver and received by the further transceiver.

According yet further still to the first aspect of the invention, one of the one or more received signals may comprise one of the one or more transmitted signals after being reflected by at least one of the one or more moving objects.

According to a second aspect of the invention, a system for controlling lighting in an area of interest, comprising: a plurality of radio transceivers in the area, configured to receive a plurality of signals, one or more signals of the plurality of signals having reflected contributions from one or more moving objects in the area; and one or more controllers of the plurality of the plurality of transceivers, configured to: analyze, for each of the received one or more signals, a time dependence of at least a standard deviation of a received signal strength parameter (RSSP) in reference to corresponding one or more threshold values for indicating a behavioral activity change of the one or more moving objects; and adjust light characteristics of one or more lighting devices in the area, if the analysis meets a predefined criterion against the one or more threshold values at least for one of the received one or more signals.

According further to the second aspect of the invention, one of the plurality of transceivers with one corresponding controller of the one or more controllers may be active and configured to determine that an object has intruded into the area or a portion of the area, and to wake up other radio transceivers of the plurality of radio transceivers into an active state.

Further according to the second aspect of the invention, one of the plurality of transceivers with one corresponding controller of the one or more controllers may be active and configured to determine that an object has intruded into the area or a portion of the area, and to wake up other radio transceivers of the plurality of radio transceivers into an active state.

Still further according to the second aspect of the invention, each of the plurality of transceivers with a corresponding controller may be configured to provide, autonomously, the analysis of respective received signals and to adjust the light.

According to a third aspect of the invention, a method for monitoring one or more moving objects in an area of interest to control lighting in the area by an apparatus, the method comprising: transmitting one or more signals by at least one wireless radio transceiver of the apparatus; receiving one or more signals, each having reflected contributions from at least one of the one or more moving objects in the area, by the at least one wireless radio transceiver of the apparatus; analyzing, by a controller of the apparatus, a time dependence of at least a standard deviation of a received signal strength parameter (RSSP) in reference to corresponding one or more threshold values for indicating a behavioral activity change of the one or more moving objects; and adjusting, by the controller of the apparatus, light characteristics of one or more lighting devices in the area, if the analysis meets a predefined criterion at least for one of the received one or more signals.

According to a fourth aspect of the invention, a non-transitory computer readable storage medium tangibly storing computer program instructions capable of being executed by a computer processor, the computer program instructions defining code for: transmitting one or more signals by at least one wireless radio transceiver of an apparatus; receiving one or more signals, each having reflected contributions from at least one of the one or more moving objects in the area, by the at least one wireless radio transceiver of the apparatus; analyzing, by a controller of the apparatus, a time dependence of at least a standard deviation of a received signal strength parameter (RSSP) in reference to corresponding one or more threshold values for indicating a behavioral activity change of the one or more moving objects; and adjusting, by the controller of the apparatus, light characteristics of one or more lighting devices in the area, if the analysis meets a predefined criterion at least for one of the received one or more signals.

BRIEF DESCRIPTION OF THE DRAWINGS

These and other features and aspects of the present disclosure will become better understood when the following detailed description is read, with reference to the accompanying drawings, in which the same reference characters designate identical or functionally equivalent parts throughout the drawings, wherein:

FIGS. 3a-3d are exemplary diagram/flow charts of non-limiting examples for analyzing behavioral activities of the moving objects (students), e.g., during a class, according to various embodiments of the invention;

DETAILED DESCRIPTION

Figure 1A:
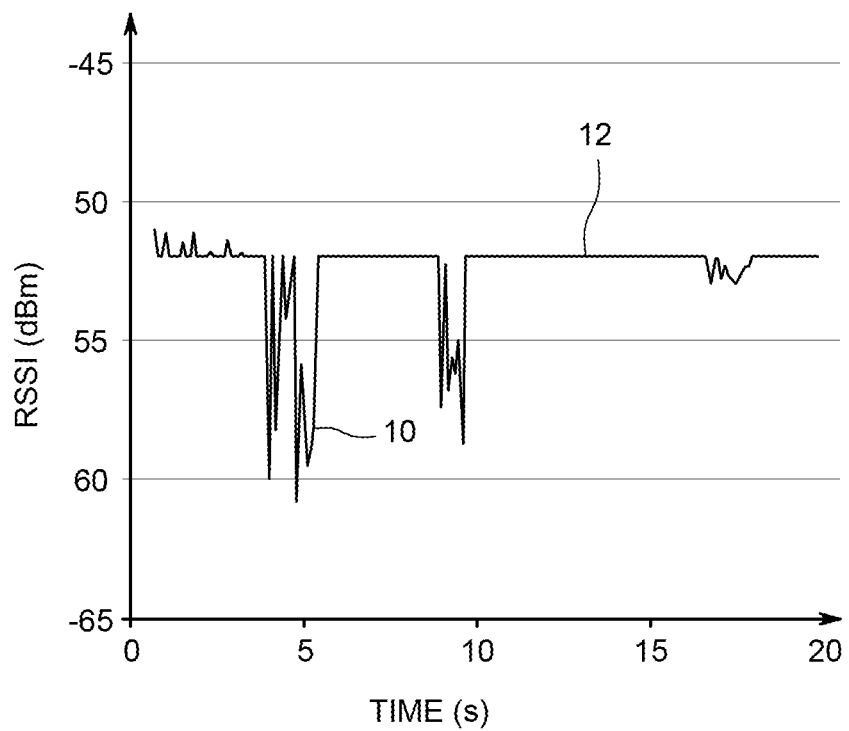
FIGS. 1a and 1b are exemplary time diagrams of a periodically sampled RSSI signal (FIG. 1a) and a standard deviation of the collected RSSI signal (FIG. 1b) for implementing various embodiments of the invention.

Recently, extensive research has been undertaken to combine intrusion detection capabilities with nodes in wireless radio-frequency (RF) networks, in order to define wireless sensor networks. Wireless sensor networks generally comprise multiple wireless nodes which are adapted to communicate with each other according to one or more wireless communication protocols. Then, such a wireless network system can use the same radio-frequency (RF) signals both for communication and for intrusion detection. The network system generally comprises a plurality of wireless nodes adapted to communicate with each other, directly or through other nodes, via radio-frequency signals. Each node is also generally capable of measuring the received signal strength (RSS) of the radio-frequency signals sent by its neighboring nodes. By detecting a significant change or variation in the received signal strength, which is generally due to a change in the immediate physical environment of the receiving node, the node can determine if the variation in the received signal strength value is due to an intrusion or not. Thus, potentially each of the wireless nodes of the network generally can act as an intrusion detection sensor.

Various embodiments of the invention, presented herein, implement a wireless feedback approach for active lighting control applications.

New apparatus, system, method and a computer related product (e.g., a computer readable memory) are presented for lighting control using active wireless/active feedback monitoring of the behavioral activity of moving objects, for the purpose of lighting control in an area of interest using, for example, a time dependence of a received signal strength parameter (RSSP) and a calculated standard deviation of the RSSP. The presented embodiments may be used based on existing smart lamp wireless networking technologies such as ZIGBEE®, WiFi, BLUETOOTH® and the like. Human presence within the range of an established wireless network can modulate the wireless signal strength between wireless nodes. For example, using the monitored variation in the standard deviation of the wireless signal strength between network nodes as an input to a smart lamp lighting system, local human activity may be used to directly control ambient lighting conditions such as luminaire lumen output (or luminaire light value), color temperature, light distribution, and/or other lighting characteristics based on the level of human activity within an area of interest (e.g., a room, a classroom, a hall, a street, a parking space, a department store, and the like). For example, in a classroom application, the ambient lighting color temperature may be automatically lowered to achieve a calming effect, in response to increased student motion.

For the purposes of the present invention, a term "smart lamp" can be broadly interpreted as a lighting device having lighting characteristics (such as color temperature, lumen output, spatial distribution and the like) which can be programmatically controlled. Moreover, such a smart lamp may comprise a wireless RF receiver for receiving a wireless command to implement the aforementioned programmable control. Furthermore, according to various embodiments described herein, such a smart lamp may comprise a wireless RF transceiver having both receiving and transmitting wireless capabilities as described herein, e.g., for receiving a wireless signal from another network node/transceiver and for sending back an acknowledgement wireless signal. Still further, such a wireless RF transceiver in the smart lamp may also comprise a controller (microprocessor) to provide monitoring of one or more moving objects in an area of interest to control lighting in that area using the smart lamp (and possibly other lighting devices), as further described herein.

Figure 2:
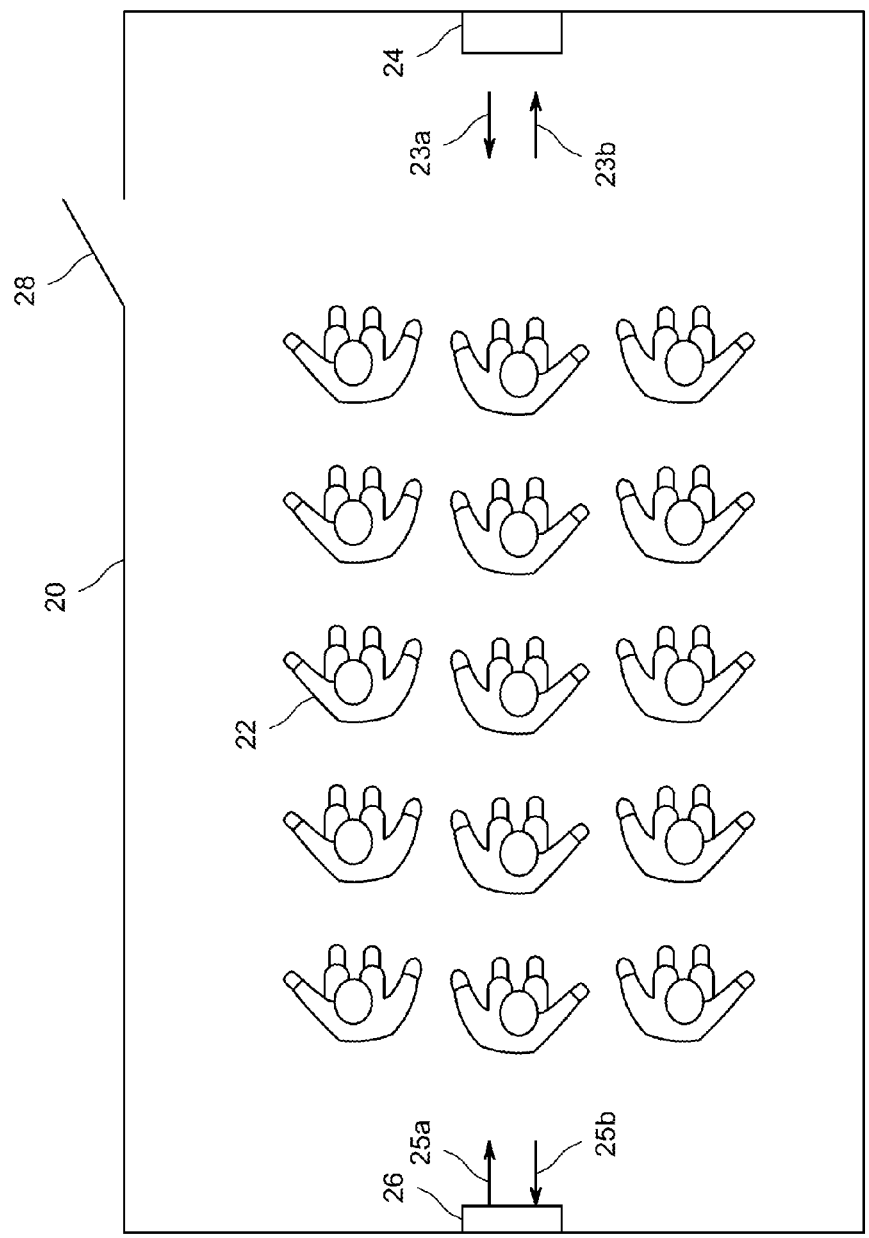
FIG. 2 is a diagram of a classroom with monitoring of student behavioral activities for the purpose of adjusting light characteristics, according to an embodiment of the invention.
Figure 5:
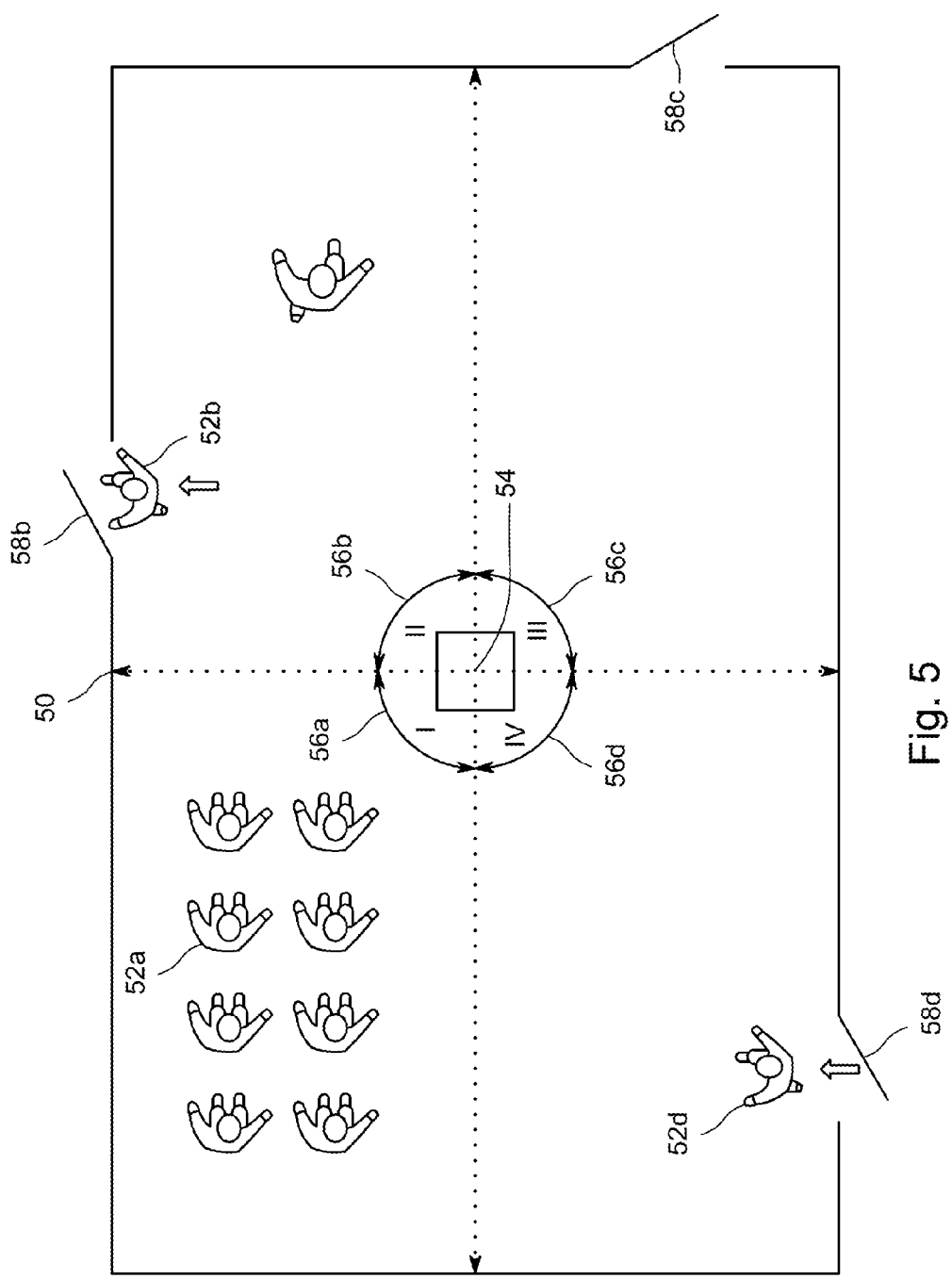
FIG. 5 is an exemplary diagram of a large area room, using one wireless RF device for monitoring behavioral activities of moving objects (students) simultaneously in four quadrants for adjusting light characteristics, according to an embodiment of the invention.
Figure 6:
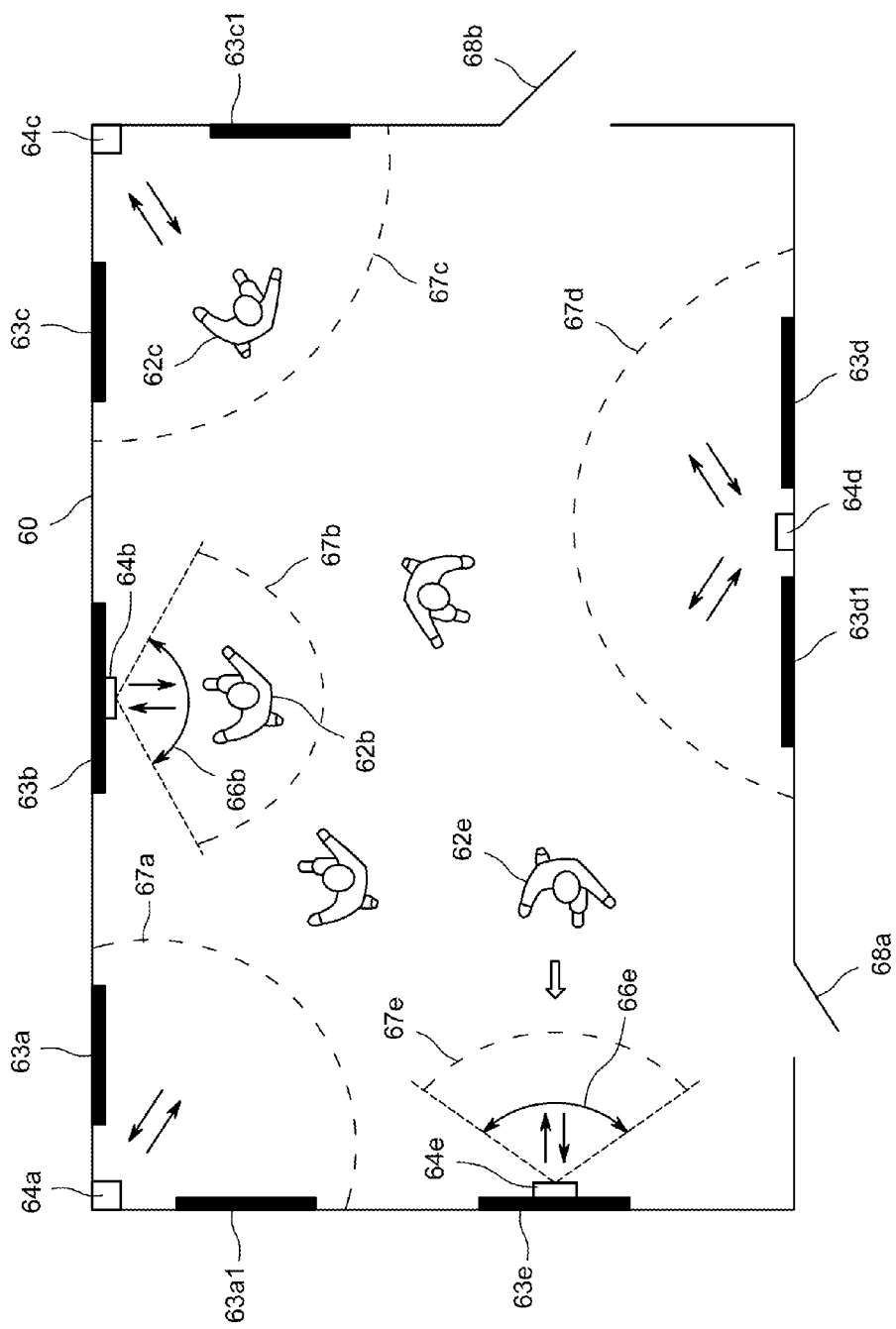
FIG. 6 is another exemplary diagram of a room/area, which is provided with an automated total solution control system for lighting control using multiple wireless RF devices, according to various embodiments of the invention.

According to the embodiments described herein, the wireless network can be interpreted broadly as a multi-node wireless system such as shown, for example, in FIGS. 2 and 6, or a system comprising one node (e.g., as shown in FIG. 5) and having a wireless radio transceiver with multiple inputs (received signals), and/or multiple outputs (transmitted signals), and/or moving (rotating) antenna or multiple antennas. Moreover, in a multi-node implementation, the nodes may operate independently (where each node can provide the analysis of the received signals by that node), and/or cooperatively (where the received signal information is shared between the nodes). The cooperating mode may be implemented using one central node which may be configured to provide the analysis of the received signals by all the nodes and to adjust the light characteristics of the corresponding lighting devices in the area of interest. Alternatively, it can be more than one central node, depending on the specific topology and application.

According to an embodiment of the invention, a basic node of a lighting control system can comprise an apparatus for monitoring one or more moving objects in an area of interest, to control lighting in the area. Such apparatus may comprise at least one wireless radio transceiver configured to transmit one or more signals, and to receive one or more signals, each having reflected contributions from at least one of the one or more moving objects in the area. The apparatus can further comprise a controller (e.g., a microprocessor) of the at least one wireless radio transceiver, configured to analyze, for each of the received one or more signals, a time dependence of a received signal strength parameter (RSSP) including a RSSP standard deviation in reference to corresponding one or more threshold values for indicating a behavioral activity change of the one or more moving objects, and to adjust light characteristics (e.g., by providing a command using wireless or wired means) of one or more lighting devices in the area, if the analysis meets a predefined criterion at least for one of the received one or more signals.

It is noted that for the purposes of this invention, the received signal strength parameter (RSSP) may be the received signal strength indicator (RSSI), conventionally used for RF signal measurements. The RSSP can be also measured/calculated by taking into consideration (i.e., subtracting from the RSSI) any of a measured noise/interference level, such as noise from various electronic devices, microwave ovens, cordless phones, wireless game controllers, fluorescent lights, WiFi devices, BLUETOOTH® devices and the like, as well as reflection contributions from permanent (non-moving) objects.

According to a further embodiment, each signal transmitted and received by the wireless radio transceiver may use a dedicated resource (for reducing contributions of noise and interference signals) which may be configured for different known methods of multiplexing and modulation including (but not limited to) spread spectrum techniques, using various amplitude shift keying (ASK), frequency shift keying (FSK) and phase shift keying (PSK) modulation techniques, time-division multiplexing (TDM), frequency-division multiplexing (FDM), orthogonal time-division multiplexing (OFDM) and the like. Furthermore, each wireless radio transceiver may transmit and receive signals with a predefined directivity (i.e., in a predefined direction) which may be omnidirectional (e.g., 360° or 180° depending on topology) or using a different application-driven predefined directivity as demonstrated in non-limiting examples shown in FIGS. 5 and 6.

Figure 1B:
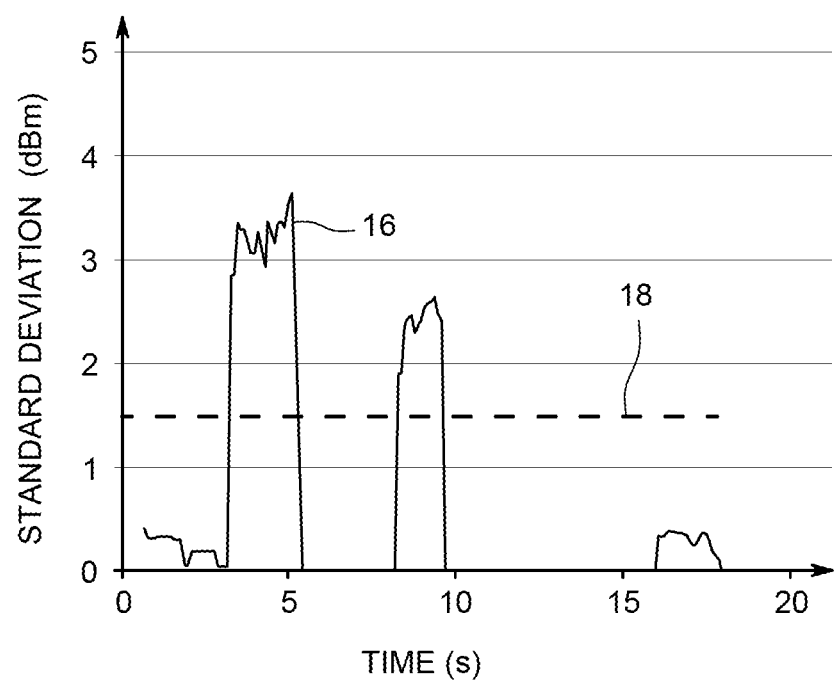

FIGS. 1a and 1b are exemplary time diagrams of a periodically sampled RSSI signal 10 (FIG. 1a), which can be generated between two ZIGBEE® nodes (e.g., as shown in FIG. 2), and a standard deviation 16 of the collected RSSI signal (FIG. 1b). The signal 10 in FIG. 1a may comprise noise signals and interference signals from other non-relevant wireless devices as well as reflected contributions from permanent (non-moving) objects and walls in a room (or in an area of interest) shown as an ambient level 12 in FIG. 1a. The ambient RSSI level 12 may change slowly over time, for example, due to local environmental changes. Periodic sampling may be performed using a small time window (such as hundreds of milliseconds to seconds) to collect N samples, so that the ambient background fluctuations (in tens of seconds, minutes, hours) can be nearly constant and therefore fall below a threshold 18 in FIG. 1b, discussed below.

The rolling window standard deviation curve 16 shown in FIG. 1b may be conventionally determined from the results shown in FIG. 1a. After acquiring N RSSI samples, the mean value (μ) of the most recent N samples can be determined by summing their values, $x_i$, and dividing by N as $$\mu = \frac{1}{N}\sum_{1}^{N} x_i.$$

Then, the standard deviation is determined (by definition) as follows:

$$\sigma = \sqrt{\frac{1}{N}\sum_{1}^{N}(x_i - \mu)^2}. \tag{1}$$

FIG. 1b also depicts a threshold level 18 for behavioral activities of moving objects (such as humans) to provide, based on a predetermined criterion, adjustment of the light parameters such as color temperature, light intensity (lumens), light distribution and the like. The threshold level 18 may be static or dynamic, appropriately chosen to eliminate false detection in a noisy environment, e.g., by using historical data for triggering. For example, the threshold level 18 may be a multiple of a standard deviation of the background signal 12, e.g., three times the background standard deviation. Periodic sampling of RSSI can be continuous (e.g., every 0.1 second). The rolling window standard deviation can be updated every sample (e.g., when the Mth RSSI sample is acquired, the current standard deviation is calculated using the previous N {M-1, M-2, . . . , M-1-(N-1)} samples, where N is the window size). It is noted that a larger N can smooth the noise, but slow the response time, while a smaller N can show more noise but make the response time faster.

FIG. 2 is a diagram of a classroom 20 with students 22 and wireless RF devices 24 and 26 for monitoring student behavioral activities for the purpose of adjusting light characteristics, according to an embodiment of the invention. The received RF signals and their standard deviations, like those shown in the non-limiting example in FIGS. 1a-1b, can be periodically generated by any of the transceiver devices 24 and 26 to analyze the behavioral activity of the students to adjust a color temperature and light intensity of lighting devices in the room (area of interest) 20.

Figure 3A:
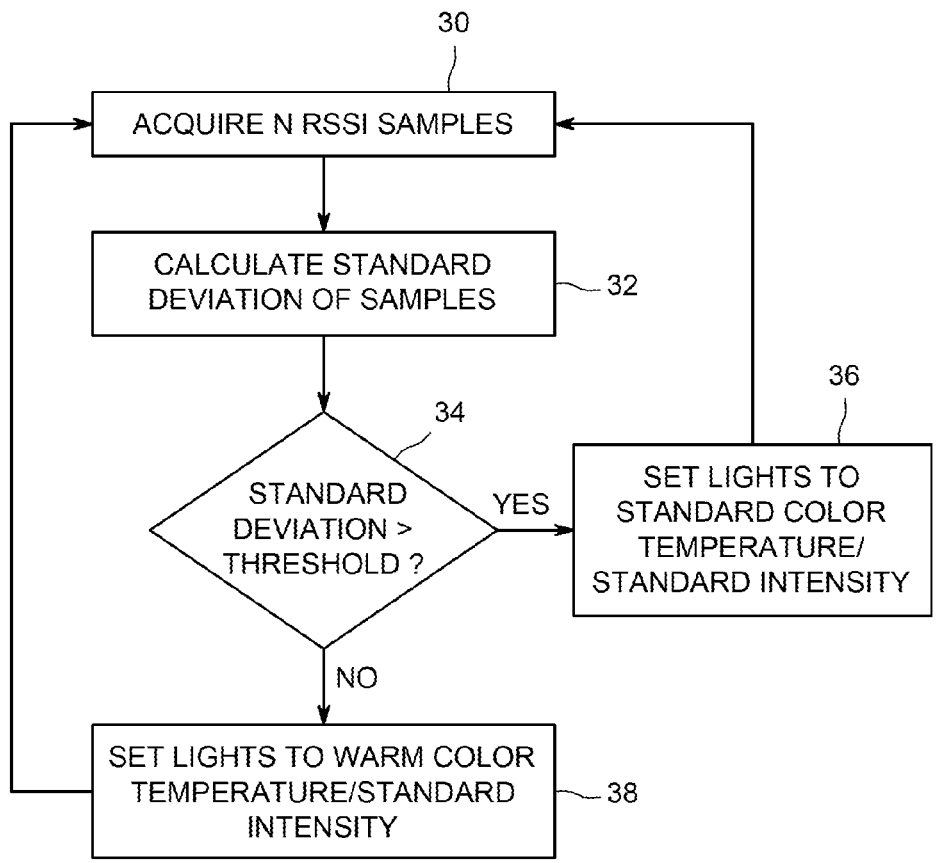

FIGS. 3a-3d demonstrate different non-limiting examples for analyzing behavioral activities of the moving objects (e.g., students) in the classroom 20 of FIG. 2 during the class, according to various embodiments of the invention. FIG. 3a is an exemplary flowchart demonstrating adjustment of light characteristics, based upon a degree of "calmness" of students in the class. After acquiring N RSSI samples (step 30) and calculating a RSSP standard deviation (step 32) using Equation (1), it is determined (step 34) whether the RSSP standard deviation exceeds a predefined threshold level (e.g., arbitrarily or dynamically chosen based on noise parameters and application requirements). If that is the case, in step 36 the lighting is set (or stays) at a standard color temperature and at a standard light intensity (i.e., a luminaire light value). If, however, the RSSP standard deviation is lower than the predefined threshold level, in step 38 the lighting is set at a warmer color temperature and at a standard intensity (to "wake up" students to an appropriate calmness level).

Figure 3B:
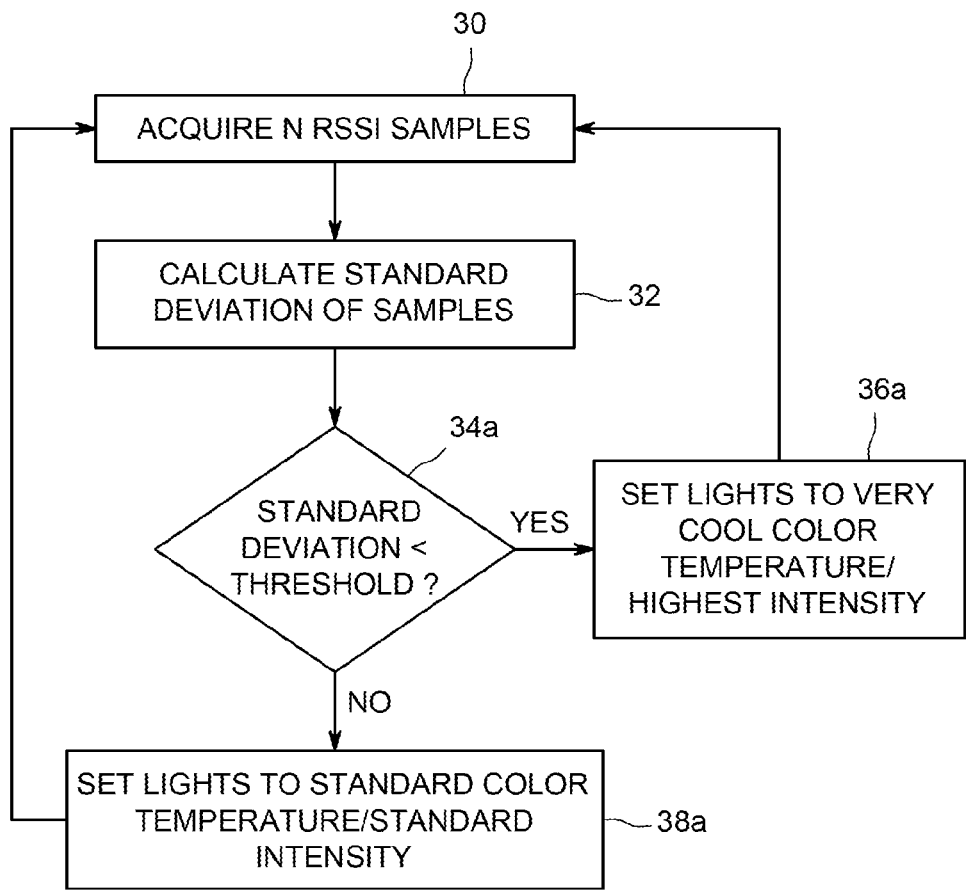

FIG. 3b is another flow chart demonstrating adjustment of lighting characteristics based on a degree of a desired "focus" of students in the class. After acquiring N RSSI samples (step 30) and calculating a RSSP standard deviation (step 32) using Equation (1), it is determined (step 34a) whether the RSSP standard deviation is below a corresponding predefined threshold level. If that is the case, in step 36a the lighting is set at a very cool color temperature and at a highest light intensity to provide the most "focused" conditions for the test. If, however, the RSSP standard deviation is higher than the predefined threshold level, in step 38a the lighting is set at a standard color temperature and at a standard light intensity.

FIG. 3c demonstrates another algorithm for adjusting lighting characteristics which can be applied, using three threshold levels 31, 33 and 35 corresponding to various predefined criteria, for the RSSP standard deviation plot from FIG. 1b. When the students 22 are in a normal state, which may correspond to a measured RSSP standard deviation being between threshold levels 33 and 35, the standard color temperature and standard light intensity for the illumination can be used. When the students 22 are in a lower energy state (e.g., early in the morning) which may correspond to a measured RSSP standard deviation being between threshold levels 31 and 33, a warmer color temperature and the RSSP standard light intensity for class illumination may be used. When the students 22 are in a highest (hyperactive) energy state (e.g., during stimulating discussions) which may correspond to a measured RSSP standard deviation being above the threshold level 35, a cooler color temperature and the standard light intensity for class illumination may be used. Finally, when the students 22 are in a highest concentration level (e.g., during a test with a minimized movement activity) which may correspond to a measured RSSP standard deviation being below the threshold level 31, a very cool color temperature and a high light intensity for class illumination may be used.

Figure 3D:
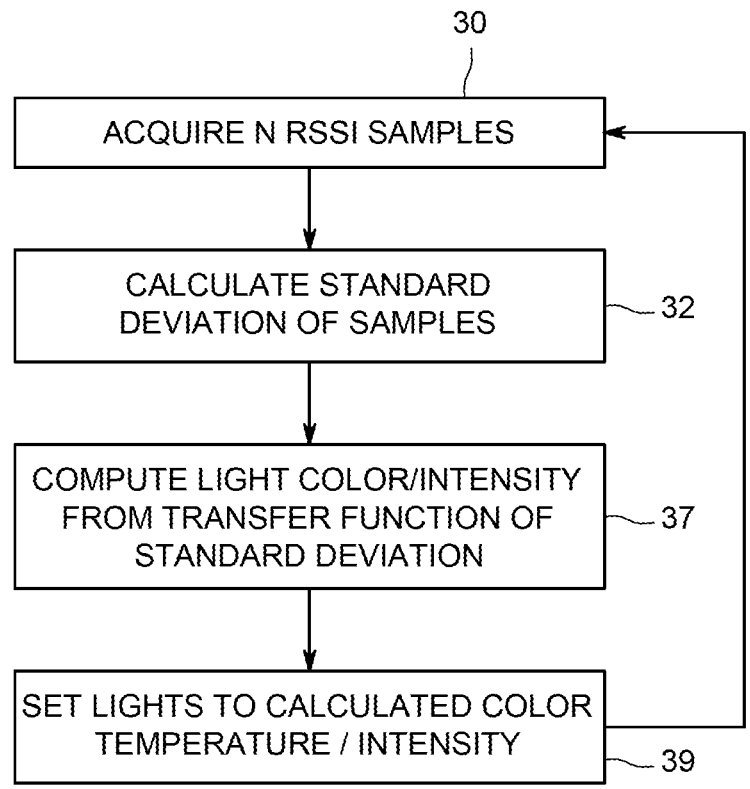

FIG. 3d is another exemplary flowchart, demonstrating a further algorithm for adjusting lighting characteristics. After standard steps 30 and 32, in step 37 the desired color temperature and light intensity are calculated using a transfer function of a RSSP standard deviation. Based on this calculation, in step 39, the calculated color temperature and light intensity are set. For example, according to one embodiment, the calculated color temperature CCT($\sigma$) can be determined using a linear equation as follows:

$$CCT(\sigma) = CCT_{min} + \frac{(CCT_{max} - CCT_{min})}{(\sigma_{max} - \sigma_{min})} * (\sigma - \sigma_{min}), \quad (2),$$

using corresponding parameters set to $CCT_{min}=2700K$, $CCT_{max}=3500K$, $\sigma_{min}=1$ dBm, $\sigma_{max}=5$ dBm.

It is further noted that more complicated nonlinear CCT mappings may be used as well. Also, a time constant for the response time can be further considered to prevent unpleasing rapid switching between lighting states.

The color temperature adjustments may be performed using various light sources/lamps using conventional methods. For example, a white LED (light emitting diode) source utilizing red, green and blue color LEDs (multiple LEDs for each color) may be adjusted to change relevant contributions of the red, green and blue LEDs by changing respective light intensities of different color LEDs, by turning on and off some LEDs, and/or by utilizing additional filtering. Incandescent halogen and fluorescent lamps can be also adjusted by changing intensities and/or by additional filtering to change the color temperature. In addition, different sets of lamps can be activated and/or deactivated to provide desired color temperatures. The light intensity may be, for example, conventionally changed by varying applied current/voltage parameters.

Referring back to FIG. 2, the wireless RF devices 24 and 26 can be nodes of a wireless network, as described herein. For example, the wireless devices 24 and 26 may be ZIGBEE® nodes, one of which can be a coordinator/controller (e.g., the device 24) and the other can be a smart lamp (e.g., the device 26) or vice versa. The location of the devices 24 and 26 is exemplary and may be different than shown (near the wall, at different walls, off the wall, etc.). According to one embodiment, the ZIGBEE® coordinator 24 can periodically send a wireless message 23a to the corresponding wireless smart lamp 25, which is received by the smart lamp 25 as a signal 25b. Then the smart lamp can send an acknowledgment signal 25a. The wireless signal strength of the received acknowledgment signal 23b (with contributions reflected from the moving objects in the classroom 20) is measured by the coordinator 24 and analyzed as described herein. If one of the predefined criteria is met for the standard deviation threshold values such as values 31, 33 or 35, the coordinator 24 can provide a command (wirelessly or through a wired connection) to adjust the color temperature and light intensity of the one or more lighting devices, as described herein.

According to further embodiments, there are many other possible scenarios for using wireless devices/nodes 24 and 26. For example, the coordinator device 24 may also be configured to receive its own signal 23a after being reflected from the moving objects 22 (also reflected from the wall and other permanent objects in the room 20) with subsequent analysis as described herein.

Moreover, the acknowledgement signal may comprise values of the RSSP measured at the node 26 for the received signal 25b which is further analyzed by the coordinator 24 by generating a RSSP standard deviation curve for the signals received by the RF device 26. Thus, using two sets of measurements and corresponding standard deviations may improve the accuracy of adjusting light characteristics of the lighting devices in the area (room) 20. However, it should be emphasized that the color temperature and light intensity adjustments in the room 20 shown in FIG. 2 may be performed using only one device, for example, the coordinator 24, if necessary, as further discussed herein.

Furthermore, an initial presence (occupancy sensing) of at least one moving object (a student 22), for example, entering the door 28 may be detected by analyzing the RSSP and/or RSSP standard deviation signals (like those shown in FIGS. 1a and 1b) using received signals by the coordinator 24, followed by a corresponding adjustment of the light characteristics of one or more lighting devices in the area (i.e., turning the light on).

Figure 4:
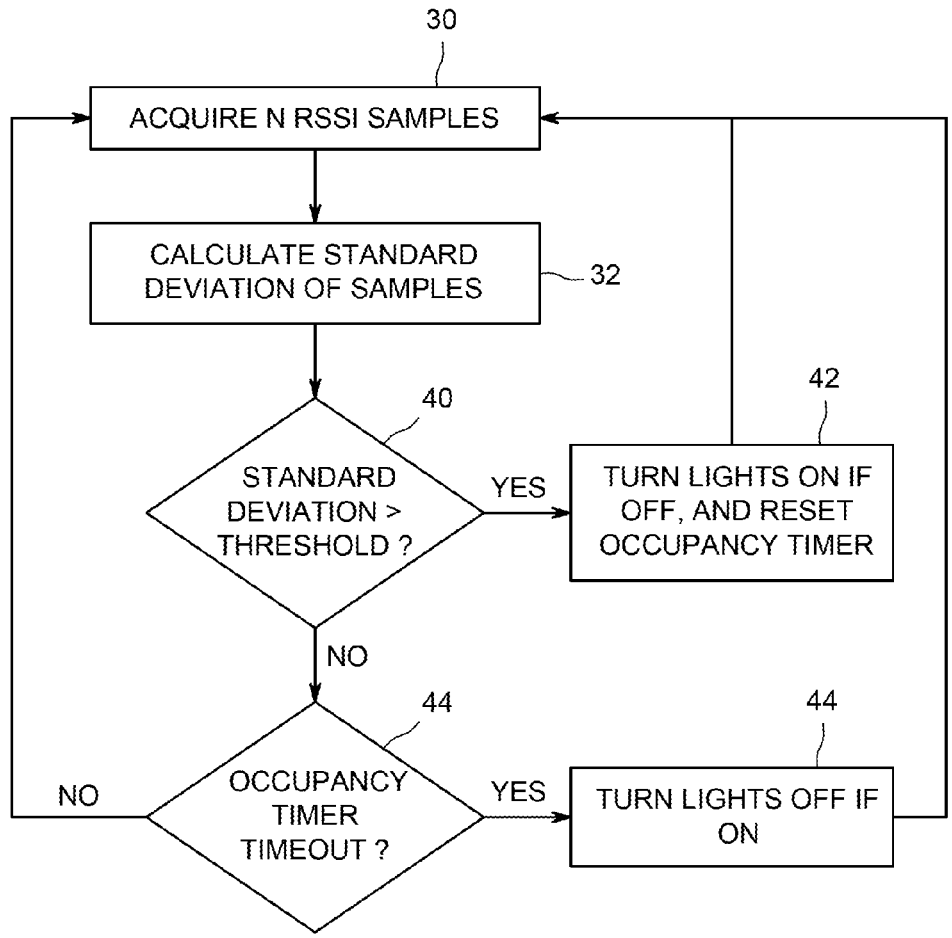
FIG. 4 is a flowchart demonstrating occupancy sensing using threshold detection, according to an embodiment of the invention.

FIG. 4 is a flowchart demonstrating occupancy sensing using standard deviation threshold level according to the embodiment of the invention. After standard steps 30 and 32, in step 40, it is determined whether the RSSP standard deviation is above a predefined or dynamic threshold (which may be different from the thresholds in the examples of FIGS. 3a-3c) set, based on the application. If that is the case, in step 42, the corresponding lighting device is turned on (lights on) and an occupancy timer is reset. If, however, the RSSP standard deviation is below the predefined threshold, in step 44, it is further ascertained whether the occupancy timer has timed out. If that is the case, the lights are turned off. If not, the process goes back to step 30.

FIG. 5 is an exemplary diagram of a large area room 50 with doors 58a, 58b and 58c, where a wireless RF device 54 monitors behavioral activities of moving objects (students) separately in four quadrants 56a, 56b, 56c and 56d respectively for adjusting light characteristics, according to an embodiment of the invention. The wireless RF device (coordinator) 54 may comprise a transceiver having four receivers, each monitoring, using corresponding directional antennas, a different portion 56a, 56b, 56c or 56d of the area/room 50 for detection of the behavioral activity of the one or more moving objects (e.g., students), in order to adjust the light characteristics of the different portions of the area 50 to provide light distribution among a plurality of lighting devices in the area 50. In this approach, a transceiver may transmit one signal omnidirectionally but receive the reflected signals separately in each quadrant using the directional receiver. Moreover, a typical transceiver can use a single antenna to transmit and receive. Then one node can transmit omnidirectionally, while the other nodes can receive/transmit directionally.

According to a further embodiment, the wireless RF device 54 may have a transceiver configured to provide four transmitted signals in four directions in quadrants 56a, 56b, 56c and 56d using directional transmitters (with corresponding directional antennas). Also different signal resources and/or modulation parameters (e.g., frequency, amplitude, phase, time, cyclic prefix and the like) can be used by each transmitter in each quadrant to minimize interference and noise signals. In yet another embodiment, the plurality of receivers may be implemented as one receiver using one moving antenna (or a radar antenna) to monitor the different portions of the area at different instants in time, as described herein.

As shown in FIG. 5, a number of activities are taking place in the different portions of the area 50. For example, in the quadrant 56d, a person 52d enters the door 58d which can be detected by the wireless RF device 54, e.g., by analyzing the threshold value for the RSSP standard deviation of the received signal(s) in the quadrant 54d by the coordinator 54, followed by a corresponding adjustment of the light characteristics of one or more lighting devices in the area 56d (i.e., turning the light on).

In the quadrant 56b, a person 52b is leaving the room 50, so that only one person is still left in the quadrant 56b. This may be detected and analyzed, using the standard deviation value of the RSSP of the received signals in the quadrant 54b by the coordinator 54, followed by a corresponding adjustment of the light characteristics of one or more lighting devices in the area 56b (i.e., dimming the light intensity by a certain value). In the quadrant 56c, the light may off because no moving objects have been detected in the area 56c.

Finally, in the quadrant 56a, the scenario can be similar to the one in FIG. 2, where students are having a class. The adjustment of the light characteristics in the quadrant 56a may be similar to the description provided in reference to FIG. 2 with a difference that the detection and analysis in FIG. 5 is performed in the quadrant/portion 56a of the room 50, using the directional reception.

It is further noted according to another embodiment, the controller of the wireless RF device 54 may be configured to coordinate distribution of lighting in the area/room 50 and beyond using the plurality of directional receivers, each monitoring a different portion of the area 50 as described herein. For example, if a class with a lot of students 52a is held in the quadrant 56a (with a lot of behavioral activity detected in quadrant 56a), then the adjacent quadrant 56d not having any detected moving objects may have some illumination (e.g., dimmed illumination) provided for comforting the students 52a in the area 56a. Also, if the person 52b is leaving the room 50, the coordinated illumination command (i.e., turn lights on) may be automatically provided to a further room, to which the person 52b is going, by the controller of the wireless RF device 54.

FIG. 6 is another non-limiting exemplary diagram of a room/area 60 such as a room in a museum, department store and the like, which is provided with an automated total solution control system for lighting control in the room 60. The system comprises multiple wireless RF devices 64a, 64b, 64c, 64d and 64e (with corresponding controllers/microprocessors), according to various embodiments of the invention. The room 60 comprises exhibition items 63a, 63a1, 63b, 63c, 64c1, 63d, 63d1, and 63e, which may be paintings or exhibits in a museum requiring additional illumination for a better visual experience. They can also be various exhibits of jewelry, watches, other sale items in department stores and the like.

Before any person (moving object) enters the room 60, all but one of the wireless RF devices 64a, 64b, 64c, 64d and 64e may be inactive (i.e., asleep or off) to save energy. Only one device, for example, the device 64*a* may be in an active state (sending and receiving wireless signals). When one or more moving objects (people) are detected by the device 64*a* (using the occupancy sensing methodology described herein, e.g., in FIG. 4) entering the room 60 through a door 68*a* or 68*b*, the controller of the device 64*a* can provide a general illumination in the room 60, which can be further tuned later on, for example, by adjusting the color temperature and the light intensity of lighting devices, based upon behavioral activity of the people (moving objects) in the room, similar to the solution described in FIG. 2.

Moreover, upon detecting people entering the room 60 for the first time, the device 60 can wake up other devices 64*b*, 64*c*, 64*d* and 64*e*, so that they can start active monitoring of the moving objects according to embodiments described herein. For example, after waking up, devices 63*b* and 63*e* may use transmitters and/or receivers with a predefined directivity 66*b* and 66*e* respectively. Then if a person approaches the exhibition item 63*b* or 63*e* and crosses a threshold perimeter 67*b* or 67*e* (established based on the threshold value of the RSSP standard deviation), as may be detected respectively by the device 63*b* or 63*e*, the additional illumination of the exhibition items 63*b* or 63*e* is provided by a corresponding controller/microprocessor. Thus, as shown in FIG. 6, the exposed item 63*b* is provided with this additional illumination since a person 62*b* has already crossed the threshold line 67*b*, and the item 63*e* will be provided with such additional illumination, as soon as a person 62*e* crosses the threshold line 64*e*. It is further noted that the devices 64*b* or 64*e* may have further capabilities to adjust the color temperature and light intensity of the additional illumination, based on the behavioral activity of people in front of respective exhibition items 63*b* or 63*e*, as described herein.

Other devices 64*a*, 64*c* and 64*d* may have similar functionalities as the devices 64*b*, and 64*e*. The difference is that the predefined directivity for the transmitters and receivers in these devices is defined as a function of the topology of the wall: being 90° for the devices 64*a* and 64*c*, and 180° for the device 64*d*. Similarly, if a respective threshold line 67*a*, 67*c* or 67*d* is crossed by a person, the additional illumination can be provided to two exhibition items 63*a* and 63*a*1, 63*c* and 63*c*1, or 63*d* and 63*d*1 respectively. For example, as shown in FIG. 4, the exposed items 63*c* and 63*c*1 are provided with this additional illumination, since a person 42*c* has already crossed the threshold line 67*b*. Similar to the devices 64*b* or 64*e*, the devices 64*a*, 64*c* and 64*d* may have further capabilities to adjust the color temperature and the light intensity of the additional illumination, based on the behavioral activity of people in front of respective exhibition items.

As described herein, the devices 64*a* 64*b*, 64*c*, 64*d* and 64*e* can be configured to operate autonomously, semi-autonomously or using a central computing device, to provide the analysis of respective received signals and to adjust the light characteristics of relevant lighting devices. It is further noted that the devices/nodes 64*a* 64*b*, 64*c*, 64*d* and 44*e* may be configured to receive additional signals from each other, using further dedicated resources (to minimize interference) to further adjust light characteristics of lighting devices in the room 60, e.g., for optimizing the color temperature, luminaire light value (light intensity) and possibly the distribution of the lighting devices in the room 60.

According to further embodiments, the examples presented in FIGS. 1-6 are non-limiting and can be expanded to many other applications. For example, a similar approach for light control may be used in a parking garage, in a zoo, in highways and streets and the like, generally based on analysis of behavioral activity of moving objects (such as cars, peoples, pets/animals, etc.) using wireless RF devices, as described herein, to optimize such lighting parameters as color temperature, luminaire light value (light intensity) and distribution of the lighting devices among others.

Yet, according to another embodiment, a detection threshold can be set high enough (e.g., see FIG. 1*b*), so that only near-field motion (about 10 cm between a moving object and a wireless RF device) will trigger a detection event to adjust a device such as corresponding non-contact wall switch comprising this wireless RF device for controlling at least one of the one or more lighting devices. This near-field approach may be used for a number of applications including non-contact wall switches for light control as described herein, a hermetically sealed switch interface, and potentially a control which responds to a gesture.

Figure 7:
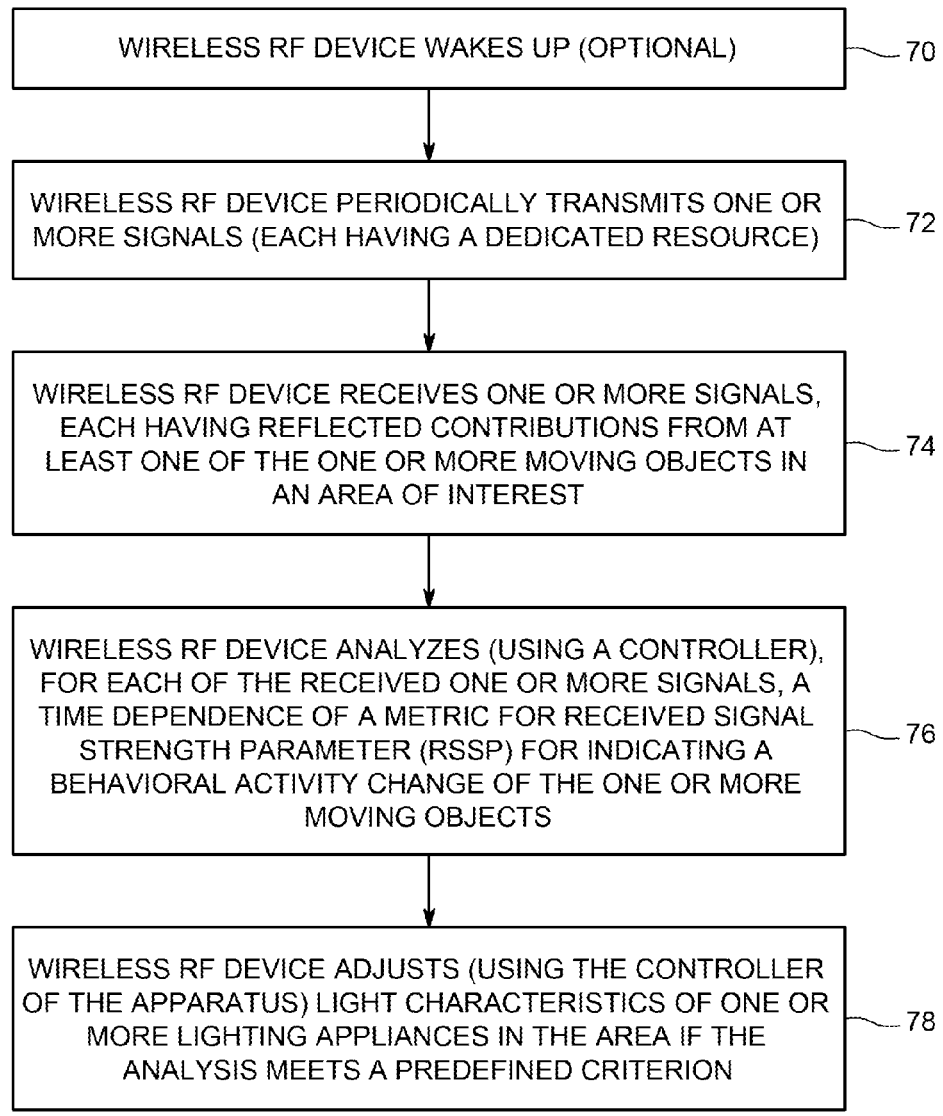
FIG. 7 is a flowchart summarizing implementation of embodiments disclosed in FIGS. 1-6.

FIG. 7 is a flowchart summarizing implementation of embodiments disclosed in reference to FIGS. 1-6. It is noted that the order of steps shown in FIG. 7 is not required, so in principle, the various steps may be performed out of the illustrated order. Also certain steps may be skipped, different steps may be added or substituted, or selected steps or groups of steps may be performed in a separate application, following the embodiments described herein.

In a method according to this exemplary embodiment, as shown in FIG. 7, in a first step 70, a wireless RF device (a wireless node) is woken up (if it was asleep) by another device which detected a moving object in an area of interest. In a next step 72, the wireless RF device periodically transmits one or more signals (each having a dedicated resource). In a next step 74, the wireless RF device receives one or more signals, each having reflected contributions from at least one of the one or more moving objects in the area of interest.

In a next step 76, the wireless RF device analyzes (using a controller), for each of the received one or more signals, a time dependence of a metric for received signal strength parameter (RSSP), e.g., the metric including the RSSP standard deviation, in reference to corresponding one or more threshold values for indicating a behavioral activity change of the one or more moving objects. In a next step 78, the wireless RF device adjusts (using the controller) light characteristics of one or more lighting devices in the area, if the analysis meets a predefined criterion (e.g., reaching one of the one or more threshold values) for at least one of the received one or more signals.

Figure 8:
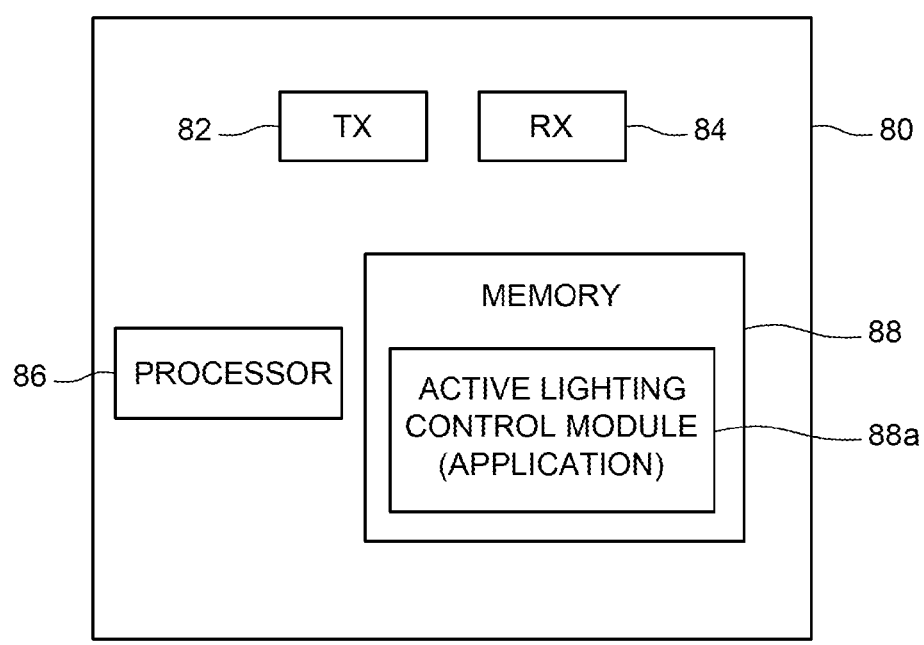
FIG. 8 is a block diagram of a wireless RF device (node), which can be used for implementing various embodiments of the invention.

FIG. 8 shows an example of a block diagram of a wireless RF device (node), which can be used for implementing various embodiments of the invention described herein. FIG. 8 is a simplified block diagram of the device 80 that is suitable for practicing the exemplary embodiments of this invention, e.g., in reference to FIGS. 1-7, and a specific manner in which components of an wireless RF device are configured, to cause that computing device to operate.

The device 80 may comprise, e.g., at least one transmitter 82, at least one receiver 84, at least one processor (controller) 86, and at least one memory 88 including an active lighting control application module 88*a*. The transmitter 82 and the receiver 82 may be configured to transmit and receive signals, the received signals comprising reflected contributions from the one or more moving objects, as described herein, to adjust lighting characteristics of the corresponding lighting devices. The transmitter 82 and the receiver 84 may be generally means for transmitting/receiving and may be implemented as a transceiver, or a structural equivalent thereof.

Various embodiments of the at least one memory 88 (e.g., computer readable memory) may include any data storage technology type which is suitable to the local technical environment, including but not limited to: semiconductor based memory devices, magnetic memory devices and systems, optical memory devices and systems, fixed memory, removable memory, disc memory, flash memory, DRAM, SRAM, EEPROM and the like. Various embodiments of the processor 86 include but are not limited to: general purpose computers, special purpose computers, microprocessors, digital signal processors (DSPs), multi-core processors, embedded, and System on Chip (SoC) devices.

The active lighting control application module 88a may provide various instructions for performing, for example, steps 70-78 shown in FIG. 7. The module 88a may be implemented as an application computer program stored in the memory 88, but in general it may be implemented as software, firmware and/or a hardware module, or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

Unless defined otherwise, technical and scientific terms used herein have the same meaning as is commonly understood by one having ordinary skill in the art to which this disclosure belongs. The terms "first", "second", and the like, as used herein, do not denote any order, quantity, or importance, but rather are employed to distinguish one element from another. Also, the terms "a" and "an" do not denote a limitation of quantity, but rather denote the presence of at least one of the referenced items. The use of "including," "comprising" or "having" and variations thereof herein, are meant to encompass the items listed thereafter and equivalents thereof, as well as additional items. The terms "connected" and "coupled" are not restricted to physical or mechanical connections or couplings, and can include electrical and optical connections or couplings, whether direct or indirect.

Furthermore, the skilled artisan will recognize the interchangeability of various features from different embodiments. The various features described, as well as other known equivalents for each feature, can be mixed and matched by one of ordinary skill in this art, to construct additional systems and techniques in accordance with principles of this disclosure.

In describing alternate embodiments of the apparatus claimed, specific terminology is employed for the sake of clarity. The invention, however, is not intended to be limited to the specific terminology so selected. Thus, it is to be understood that each specific element includes all technical equivalents that operate in a similar manner to accomplish similar functions.

It is to be understood that the foregoing description is intended to illustrate and not to limit the scope of the invention, which is defined by the scope of the appended claims. Other embodiments are within the scope of the following claims.

It is noted that various non-limiting embodiments, described and claimed herein, may be used separately, combined, or selectively combined for specific applications.

Further, some of the various features of the above non-limiting embodiments may be used to advantage, without the corresponding use of other described features. The foregoing description should therefore be considered as merely illustrative of the principles, teachings and exemplary embodiments of this invention, and not in limitation thereof.

The invention claimed is:

1. An apparatus for monitoring one or more moving objects in an area of interest to control lighting in the area, the apparatus comprising:
   at least one wireless radio transceiver in the area configured to:
   transmit one or more signals, and
   receive one or more signals, each having reflected contributions from at least one of the one or more moving objects in the area; and
   a controller of the at least one wireless radio transceiver, configured to:
   analyze, for each of the received one or more signals, a time dependence of at least a standard deviation of a received signal strength parameter (RSSP) in reference to corresponding one or more threshold values for indicating a behavioral activity change of the one or more moving objects; and
   adjust light characteristics of one or more lighting devices in the area, if the analysis meets a predefined criterion at least for one of the received one or more signals.

2. The apparatus of claim 1, wherein the adjustment of light characteristics includes adjusting at least a color temperature of the one or more lighting devices based on exceeding or not exceeding one or more threshold values by the standard deviation of the RSSP.

3. The apparatus of claim 1, wherein the adjustment of light characteristics includes adjusting a color temperature and a luminaire light value of the one or more lighting devices based on exceeding or not exceeding one or more threshold values by the standard deviation of the RSSP.

4. The apparatus of claim 1, wherein the adjustment of light characteristics includes adjusting a distribution of the one or more lighting devices.

5. The apparatus of claim 1, where an initial presence of at least one moving object among the one or more moving objects in the area is detected by analyzing any of at least one threshold value of the standard deviation of the RSSP and a further threshold value of the RSSP.

6. The apparatus of claim 1, wherein one of the one or more threshold levels is set such that a presence of at least one moving object is only detected in a near field within about 10 cm from the apparatus to adjust a corresponding non-contact switch for controlling at least one of the one or more lighting devices.

7. The apparatus of claim 1, where all transmitted and received signals are omnidirectional.

8. The apparatus of claim 1, wherein the at least one wireless radio transceiver comprises a smart lamp.

9. The apparatus of claim 1, wherein the at least one wireless radio transceiver comprises a plurality of directional receivers, each monitoring a different portion of the area for indication of the behavioral activity of the one or more moving objects, to adjust the light characteristics of the different portions of the area individually to include a light distribution among a plurality of lighting devices in the area.

10. The apparatus of claim 9, wherein the at least one wireless radio transceiver comprises a plurality of directional transmitters, each providing a transmitted signal for a portion of the area monitored by a corresponding receiver of the plurality of directional receivers.

11. The apparatus of claim 9, where the plurality of receivers are implemented as one receiver using one moving antenna to monitor the different portions of the area at different time instances.

12. The apparatus of claim 1, wherein one of the one or more transmitted signals is received by a further transceiver in the area, and the transceiver is configured to receive an acknowledgement signal from the further transceiver as one of the one or more signals having reflected contributions from the one or more moving objects.

13. The apparatus of claim 12, wherein the acknowledgement signal comprises values of RSSP measured by the further transceiver for the one of the one or more transmitted signals by the transceiver and received by the further transceiver.

14. The apparatus of claim 1, wherein one of the one or more received signals comprise one of the one or more transmitted signals after being reflected by at least one of the one or more moving objects.

15. A system for controlling lighting in an area of interest, comprising:
   a plurality of radio transceivers in the area, configured to receive a plurality of signals, one or more signals of the plurality of signals having reflected contributions from one or more moving objects in the area; and
   one or more controllers of the plurality of the plurality of transceivers, configured to:
   analyze, for each of the received one or more signals, a time dependence of at least a standard deviation of a received signal strength parameter (RSSP) in reference to corresponding one or more threshold values for indicating a behavioral activity change of the one or more moving objects; and
   adjust light characteristics of one or more lighting devices in the area, if the analysis meets a predefined criterion against the one or more threshold values at least for one of the received one or more signals.

16. The system of claim 15, wherein one of the plurality of transceivers with one corresponding controller of the one or more controllers is active and configured to determine that an object has intruded into the area or a portion of the area, and to wake up other radio transceivers of the plurality of radio transceivers into an active state.

17. The system of claim 15, wherein one of the plurality of transceivers with one corresponding controller of the one or more controllers is a central computing device configured to provide the analysis for all of the one or received signals and to adjust the light characteristics of the one or more lighting devices in the area.

18. The system of claim 15, wherein each of the plurality of transceivers with a corresponding controller is configured to provide, autonomously, the analysis of respective received signals and to adjust the light characteristics of relevant lighting devices of one or more lighting devices in the area.

19. A method for monitoring one or more moving objects in an area of interest to control lighting in the area by an apparatus, the method comprising:
   transmitting one or more signals by at least one wireless radio transceiver of the apparatus;
   receiving one or more signals, each having reflected contributions from at least one of the one or more moving objects in the area, by the at least one wireless radio transceiver of the apparatus;
   analyzing, by a controller of the apparatus, a time dependence of at least a standard deviation of a received signal strength parameter (RSSP) in reference to corresponding one or more threshold values for indicating a behavioral activity change of the one or more moving objects; and
   adjusting, by the controller of the apparatus, light characteristics of one or more lighting devices in the area, if the analysis meets a predefined criterion at least for one of the received one or more signals.

20. A non-transitory computer readable storage medium tangibly storing computer program instructions capable of being executed by a computer processor, the computer program instructions defining code for:
   transmitting one or more signals by at least one wireless radio transceiver of an apparatus;
   receiving one or more signals, each having reflected contributions from at least one of the one or more moving objects in the area, by the at least one wireless radio transceiver of the apparatus;
   analyzing, by a controller of the apparatus, a time dependence of at least a standard deviation of a received signal strength parameter (RSSP) in reference to corresponding one or more threshold values for indicating a behavioral activity change of the one or more moving objects; and
   adjusting, by the controller of the apparatus, light characteristics of one or more lighting devices in the area, if the analysis meets a predefined criterion at least for one of the received one or more signals.

* * * * *